United States Patent
Joyce et al.

(10) Patent No.: US 10,179,583 B2
(45) Date of Patent: Jan. 15, 2019

(54) VEHICLE SUBSYSTEM COORDINATION AND CONTROL

(71) Applicant: Ford Global Technologies, LLC, Dearborn, MI (US)

(72) Inventors: John P. Joyce, West Bloomfield, MI (US); Darrel Alan Recker, Ypsilanti, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 172 days.

(21) Appl. No.: 15/084,167

(22) Filed: Mar. 29, 2016

(65) Prior Publication Data
US 2017/0282911 A1    Oct. 5, 2017

(51) Int. Cl.
B60W 30/02 (2012.01)
B60T 7/12 (2006.01)
B62D 15/02 (2006.01)
B60T 7/22 (2006.01)

(52) U.S. Cl.
CPC .............. B60W 30/02 (2013.01); B60T 7/12 (2013.01); B60T 7/22 (2013.01); B62D 15/025 (2013.01); *B60T 2201/022* (2013.01)

(58) Field of Classification Search
CPC ......... B60W 30/02; B60T 7/12; B62D 15/025
See application file for complete search history.

(56) References Cited

U.S. PATENT DOCUMENTS

| | | | |
|---|---|---|---|
| 4,637,663 A * | 1/1987 | Matsuda | B60T 8/17616 303/158 |
| 4,656,588 A * | 4/1987 | Kubo | B60T 8/17616 303/122.11 |
| 4,674,050 A * | 6/1987 | Kubo | B60T 8/17616 303/168 |
| 4,748,564 A * | 5/1988 | Matsuda | B60T 8/17616 303/156 |
| 5,220,497 A | 6/1993 | Trovato et al. | |
| 5,375,059 A | 12/1994 | Kyrtsos et al. | |
| 5,587,929 A | 12/1996 | League et al. | |
| 6,362,602 B1 * | 3/2002 | Kozarekar | B60L 11/1851 320/160 |
| 6,704,434 B1 * | 3/2004 | Sakoh | B60R 1/00 340/933 |
| 7,363,149 B2 | 4/2008 | Klausner et al. | |
| 8,050,863 B2 | 11/2011 | Trepagnier et al. | |

(Continued)

OTHER PUBLICATIONS

Skoglund, "Inertial Navigation and Mapping for Autonomous Vehicles", Linkoping studies in science and technology, Dissertations, No. 1623, Linkoping University, Department of Electrical Engineering, 2014, 100 pages.

*Primary Examiner* — Jelani A Smith
*Assistant Examiner* — Majdi Alsomiri
(74) *Attorney, Agent, or Firm* — Frank A. MacKenzie; Bejin Bieneman PLC

(57) ABSTRACT

A current value of a state-of-motion from a second controller can be received by a first controller. The first controller determines a subset of a target value of the state-of-motion to be achieved by a subsystem and transmits a command to a third controller in communication with the subsystem to achieve the subset of the target value of the state-of-motion. The third controller commands the subsystem to approach the subset of the target value of the state-of-motion.

20 Claims, 3 Drawing Sheets

(56) References Cited

U.S. PATENT DOCUMENTS

| | | | |
|---|---|---|---|
| 8,671,315 B2* | 3/2014 | MacKey | G05B 23/0283 714/47.1 |
| 9,031,073 B2* | 5/2015 | Yousefi | H04N 7/183 370/392 |
| 9,122,278 B2 | 9/2015 | Smith et al. | |
| 9,181,917 B2* | 11/2015 | Arai | F02N 15/00 |
| 9,528,835 B2* | 12/2016 | Lee | G01S 19/48 |
| 2002/0026273 A1* | 2/2002 | Tamura | B60T 7/22 701/70 |
| 2004/0069549 A1* | 4/2004 | Ono | B60L 11/1803 180/65.8 |
| 2005/0111231 A1* | 5/2005 | Crodian | B60Q 1/1423 362/545 |
| 2005/0226201 A1* | 10/2005 | McMillin | H04L 45/00 370/348 |
| 2006/0106518 A1* | 5/2006 | Stam | B60Q 1/1423 701/49 |
| 2006/0186728 A1* | 8/2006 | Mizuta | B60G 17/0152 303/3 |
| 2006/0230403 A1* | 10/2006 | Crawford | G05B 19/41865 718/100 |
| 2008/0319670 A1* | 12/2008 | Yopp | B60W 30/16 701/301 |
| 2009/0016216 A1* | 1/2009 | Ballard | B60R 16/03 370/230 |
| 2009/0045672 A1* | 2/2009 | Nishino | B60T 7/042 303/113.3 |
| 2009/0187313 A1* | 7/2009 | Kawakami | B62D 6/00 701/45 |
| 2009/0198413 A1* | 8/2009 | Miller | B60W 50/08 701/37 |
| 2009/0236903 A1* | 9/2009 | Nishino | B60T 8/442 303/3 |
| 2011/0035149 A1* | 2/2011 | McAndrew | G05D 1/0038 701/466 |
| 2011/0153532 A1* | 6/2011 | Kuge | B60W 40/09 706/12 |
| 2011/0197844 A1* | 8/2011 | Matsubara | B60R 25/00 123/179.2 |

* cited by examiner

VEHICLE SUBSYSTEM COORDINATION AND CONTROL

BACKGROUND

Autonomous and semi-autonomous vehicles include numerous sensors and subsystems in communication with a computer that determines various autonomous operations, sometimes referred to as the virtual driver. These sensors and subsystems may have different update cycles, i.e., different timing for formulating or reformulating a subsystem actuation strategy. A brake subsystem, for example, may reformulate a strategy for whether and how hard to apply the brakes several times between each time the virtual driver updates an intended route of the vehicle.

Differing update cycles can detract from the speed, smoothness, and precision with which the virtual driver can control the motion of the vehicle. For example, if a stop sign will be reached in less than the update cycle of the virtual driver, the virtual driver may stop the vehicle short of the sign or stop the vehicle in a jerky fashion. For another example, the brake system and the engine-control system of a trailing vehicle may react in an alternating manner to the commands of an adaptive cruise control attempting to maintain a constant distance between the trailing vehicle and a leading vehicle, causing the trailing vehicle to alternately ride up on and fall back from the leading vehicle.

DETAILED DESCRIPTION

Figure 1:
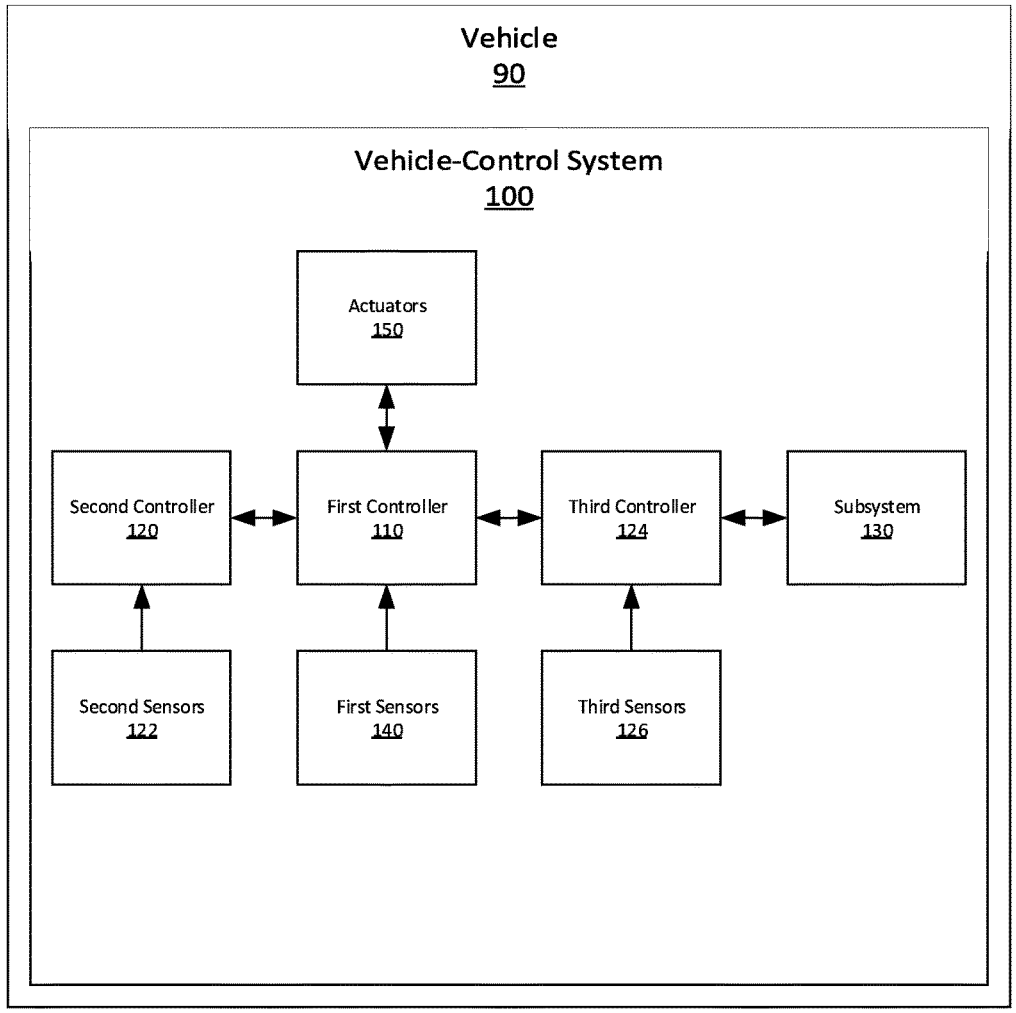
FIG. 1 is a block diagram of a vehicle-control system.

With reference to FIG. 1, a vehicle-control system 100 implemented in a vehicle 90 includes a first controller 110 that can receive a current value of a state-of-motion from a second controller 120. The first controller 110 can further determine a subset of a target value of the state-of-motion to be achieved by a subsystem 130 and transmit a command to a third controller 124 in communication with the subsystem 130 for the subsystem 130 to achieve the subset of the target value of the state-of-motion.

The system 100 allows the first controller 110 to issue commands to the subsystem 130 at an appropriate level of precision for that subsystem 130, leading to smoother, more responsive control of the subsystem 130 by the first controller 110.

FIG. 1 is a block diagram of a vehicle 90, including the vehicle-control system 100. The vehicle-control system 100 is usually implemented in the vehicle 90, and various elements of the vehicle-control system 100 are elements or components of the vehicle 90.

The vehicle-control system 100 includes the first controller 110, the second controller 120, the third controller 124, and the subsystem 130. The adjectives "first," "second," and "third" are used throughout this document as identifiers and are not intended to signify importance or order. The first controller 110 is in communication with the second controller 120 and the third controller 124, and the third controller 124 is in communication with the subsystem 130. The first controller 110 may be connected to additional controllers and subsystems.

The first, second, and third controllers 110, 120, 124 are included in the vehicle-control system 100 for carrying out various operations, including as described herein. The controllers 110, 120, 124 are computing devices that generally include a processor and a memory, the memory including one or more forms of computer-readable media, and storing instructions executable by the processor for performing various operations, including as disclosed herein. The memories of the controllers 110, 120, 124 further generally store remote data received via various communications mechanisms; e.g., the controllers 110, 120, 124 are generally configured for communications on a controller area network (CAN) bus or the like, and/or for using other wired or wireless protocols, e.g., Bluetooth, etc. The controllers 110, 120, 124 may also have a connection to an onboard diagnostics connector (OBD-II). Via a vehicle network using Ethernet, WiFi, the CAN bus, OBD-II, and/or other wired or wireless mechanisms, the controllers 110, 120, 124 may transmit messages to each other or to various devices in the vehicle 90 and/or receive messages from the various devices, e.g., controllers, actuators, sensors, etc., e.g., controllers and sensors as discussed herein. For example, the first controller 110 may receive data from first sensors 140. Although depicted as three separate controllers, two or more of the controllers 110, 120, 124 may partially or completely overlap in functionality, e.g., the second controller 120 and the third controller 124 may be the same controller.

Via communications mechanisms such as discussed above, the controllers 110, 120, 124 may receive and/or generate, calculate, etc. various data. For example, a velocity sensor 142 may be used to provide velocity data to the first controller 110. A velocity sensor 142 is generally known, and moreover, as is known, velocity data is generally available via a communication mechanism such as discussed above, e.g., via CAN communications.

One or more radar sensor or sensors 144 may be used to provide radar data to the first controller 110. For example, a radar sensor or sensors 144 may be mounted on a front of the vehicle 90, and used to measure a distance, or a change in distance over time, between the vehicle 90 and a second vehicle, e.g., as known for use in so-called adaptive cruise control systems. Further, in addition, or as an alternative, to radar sensors, use could be made of a forward-looking camera, LIDAR, vehicle-to-vehicle communications, vehicle-to-cloud communications, vehicle-to-infrastructure communications, etc.

The controllers 110, 120, 124 may each have an update cycle. An update cycle is a period of time in which a controller such as the first controller 110, second controller 120, or third controller 124 evaluates current available data and formulates a strategy of action(s) that the controller 110, 120, 124 will instruct components, e.g., actuators 150 or the subsystem 130, to perform. The update cycles of the second and third controllers 120, 124 may be shorter than the update cycle of the first controller 110, meaning that the second and third controllers 120, 124 may have numerous possible times to perform an action within one cycle of the first controller 110.

A subsystem 130 associated with the third controller 124 may be any set of components that affects the operation of the vehicle 90. For example, the subsystem 130 may be a brake subsystem, in which case the third controller 124 is a brake controller. For another example, the subsystem 130 may be a steering subsystem controlled by a steering controller 124. For a third example, the subsystem 130 may be a throttle or other propulsion control (e.g., for an electric motor), controlled by an engine control module (ECM) controller 124.

The controllers 110, 120, 124 may store in their memories, and may modify as described herein, the value of a subsystem 130 state-of-motion. The state-of-motion of the subsystem 130 is one or more motion-describing variables that the subsystem 130 affects. Motion-describing variables that could be included in a state-of-motion include, for example, longitudinal position, lateral position, longitudinal velocity, yaw rate, yaw angle, slip angle, etc. Motion-describing variables may, for example, be measured by the third sensors 122 or be inferred from the state of the subsystem 130, e.g., revolutions of a wheel of the vehicle 90. The value of the state-of-motion may be a scalar value if the state-of-motion includes one motion-related variable, or the value of the state-of-motion may be a vector value if the state-of-motion includes multiple motion-related variables.

The controllers 110, 120, 124 may act on or receive a subset of the state-of-motion, that is, may act on or receive all or fewer than all of the motion-describing variables of the state-of-motion. A "subset" of the state-of-motion is not limited to a strict subset and may include all of the motion-describing variables of the state-of-motion. Alternatively, for example, a controller 110, 120, 124 may act on or receive only the motion-describing variables describing lateral motion, or only the motion-describing variables describing longitudinal motion.

A state-of-motion is described relative to a frame of reference. The frame of reference may be absolute, relative, or a mixture of absolute and relative. For example, if a state-of-motion includes longitudinal position, lateral position, longitudinal velocity, and yaw angle, then an absolute frame of reference may include a given position on earth, against which the longitudinal and lateral positions are measured; a stopped state of the vehicle 90, against which the longitudinal velocity is measured; and due north, against which the yaw angle is measured. Alternatively, the frame of reference may be relative, that is, a previously measured value of the state-of-motion when the state-of-motion was reset. All of the motion-describing variables may be grouped together in one frame of reference, or the motion-related variables may be grouped into partial frames of reference, e.g., a frame of reference for lateral motion and a frame of reference for longitudinal motion.

An identifier identifies a frame of reference. The identifier may be stored in any suitable data structure; for example, the identifier may be stored as a separate variable or counter, or the identifier may be stored with one of the motion-related variables, e.g., the identifier occupies the most significant digits and the motion-related variable occupies the least significant digits.

The identifier is replaced if the state-of-motion switches frames of reference. For example, if the state-of-motion is unidimensional and the frame of reference is relative, the state-of-motion may reset every 1000 values, i.e., the state-of-motion may start at 0 and have a maximum value of 999. In that case, the value of the state-of-motion may increment from 999 under an original identifier "A" to 0 under a replacement identifier "B." In the event that the identifier switches, the term "original identifier" is used to refer to an earlier identifier, and "replacement identifier" a later identifier. The "original" identifier is so called only to differentiate the original identifier from any replacement identifiers. Any identifier may be an original identifier with respect to a replacement identifier. If the state-of-motion is multidimensional, i.e., includes two or more motion-describing values, and the frame of reference is relative, the value of the state-of-motion may be reset according to a predetermined condition, for example, if any motion-related variable exceeds a maximum or minimum value. An absolute frame of reference may also be reset; for example, if the vehicle 90 exceeds a given distance from a position on earth included in the frame of reference, the state-of-motion may switch to a different frame of reference including a different position on earth from among a set of possible frames of reference. Other than a maximum or minimum value, the resets of the state-of-motion may be triggered by vehicle 90 events, external communications, etc.

An offset value is the value relating an original identifier to the immediate replacement identifier. Each offset value is associated with one replacement identifier. The offset value provides a way to determine the value of the state-of-motion under a replacement identifier based on the value of the state-of-motion under an original identifier. For example, given a unidimensional state-of-motion value of 1325 under an original identifier "A," the state-of-motion value under a replacement identifier "B" with an offset value of 1000 is 325. If the state-of-motion is multidimensional, then the offset value is multidimensional.

The memories of the controllers 110, 120, 124 may store the identifiers and the offset values. Specifically, as the second controller 120 issues replacement identifiers, the controllers 110, 120, 124 may each store a table 160, 162, 164 of replacement identifiers and offset values associated with the replacement identifiers.

Figure 2:
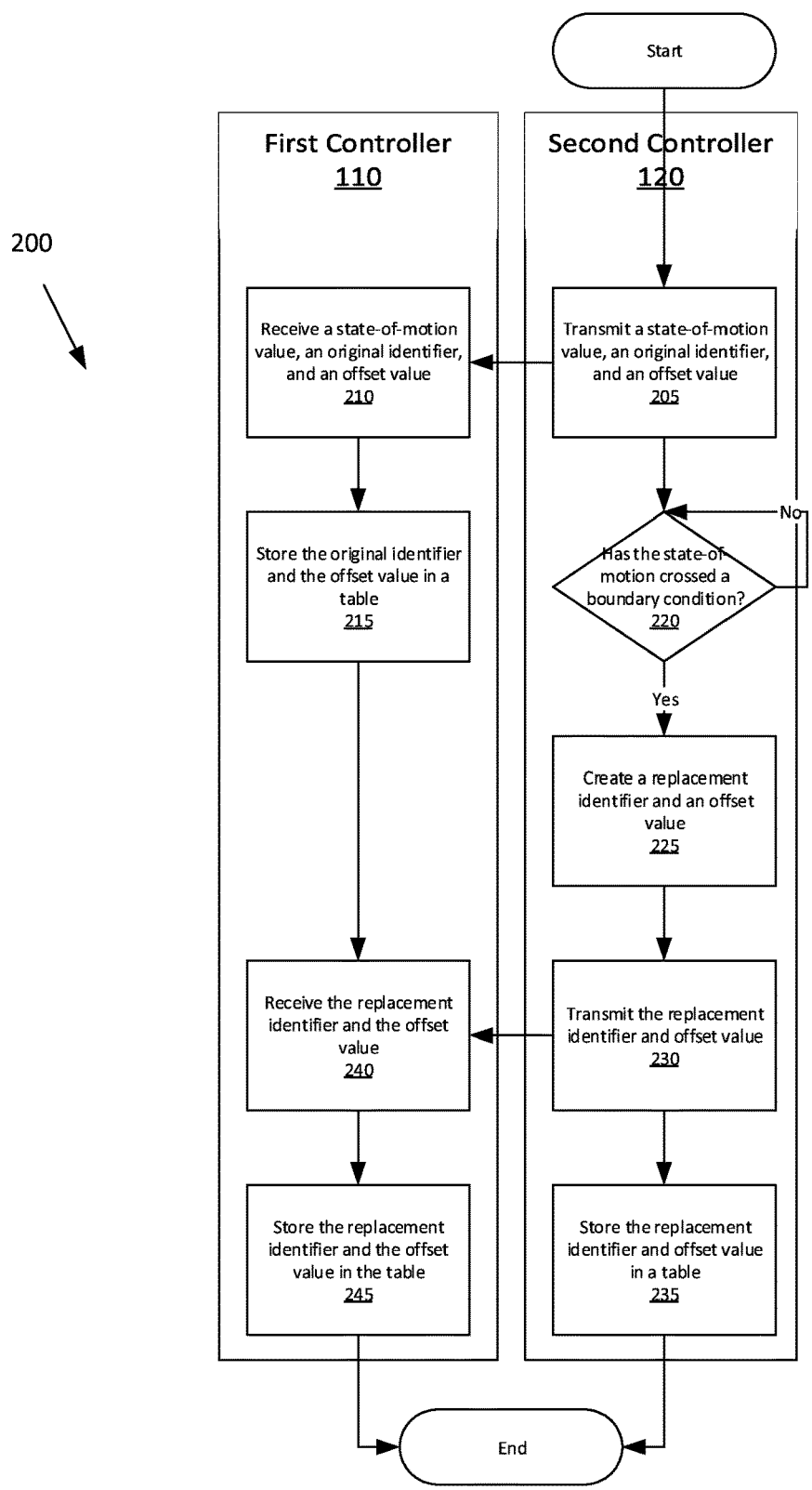
FIG. 2 is a process flow diagram of an exemplary process for updating an identifier for a state-of-motion used by a vehicle subsystem.

FIG. 2 is a process flow diagram illustrating an exemplary process 200 for updating the identifier for the counter. As seen in FIG. 2, various process blocks of the process 200 may be executed in one of the first controller 110 and one or more second controllers 120. The process begins in a block 205, in which the second controller 120 transmits the value of the state-of-motion, the original identifier associated with the subsystem state-of-motion, and the offset value associated with that identifier to the first controller 110.

Next, in a block 210, the first controller 110 receives the current value of the subsystem state-of-motion, the identifier, and the offset value associated with the identifier from the second controller 120. The first controller 110 then stores the identifier and the offset value, in a block 215.

In a decision block 220, the second controller 120 determines whether the current value of the state-of-motion has crossed a boundary condition, which may occur before, during, or after the first controller 110 stores the identifier and the offset value. The boundary condition may be a maximum or minimum value or values of the motion-related variables included in the state-of-motion or may be associated with events external to the second controller 120. If the value of the state-of-motion has not crossed the boundary condition, then the second controller 120 repeats the determination. When the value of the state-of-motion does cross the boundary condition, then the second controller 120 creates a replacement identifier and an offset value associated with the replacement identifier, in a block 225.

Next, in a block 230, the second controller 120 transmits the replacement identifier and the offset value associated with the replacement identifier to the first controller 110. Finally for the second controller 120, in a block 235, the second controller 120 stores a set, e.g., in a table or other suitable data structure, of replacement identifiers and offset values associated with the replacement identifiers.

Meanwhile, in a block 240, the first controller 110 receives the replacement identifier and the offset value associated with the replacement identifier from the second controller 120. Finally for the first controller 110, in a block 245, the first controller 110 stores a set, e.g., in a table or the like, of replacement identifiers and offset values associated with the replacement identifiers.

Figure 3:
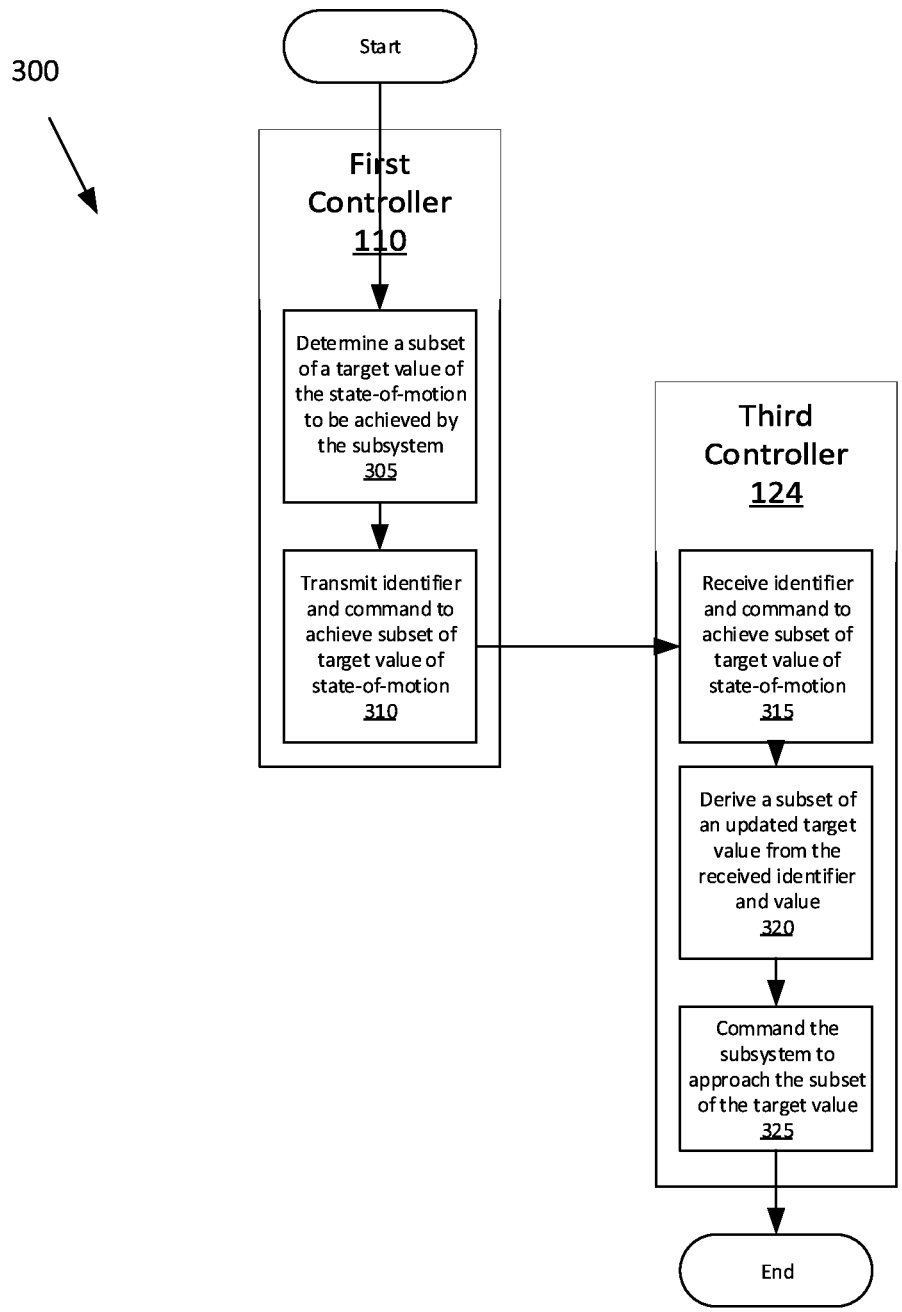
FIG. 3 is a process flow diagram of an exemplary process for commanding the vehicle subsystem to achieve a subset of a target value of a state-of-motion.

FIG. 3 is a process flow diagram of an exemplary process 300 for commanding the vehicle subsystem 130 to achieve a subset of a target value of the state-of-motion. The process 300 begins in a block 305, in which the first controller 110 determines the subset of the target value of the state-of-motion to be achieved by the subsystem 130. If, for example, the first controller 110 wants the vehicle 90 to stop at an upcoming stop sign, then the target value of the state-of-motion may include a longitudinal position corresponding to the position of the stop sign, a lateral position one lane to the right of the current lane, and a longitudinal velocity of zero. In that example, the subset of the target value of the state-of-motion may include only the longitudinal position and longitudinal velocity and not the lateral position.

Next, in a block 310, the first controller 110 transmits an identifier and a command to achieve the subset of the target value of the state-of-motion. The identifier may be the most recent replacement identifier received from the second controller 120, and which may have been read from the table 160. The first controller 110 may determine the subset of the target value of the state-of-motion on the basis of the recorded time at which the first controller 110 last received a value of the state-of-motion, known transmission or processing delays to the third controller 124 and from the third controller 124 to the subsystem 130, and/or any other relevant information.

Next, in a block 315, the third controller 124 receives the identifier and the command to achieve the subset of the target value of the state-of-motion.

Next, in a block 320, the third controller 124 derives a subset of an updated target value of the state-of-motion from the identifier and the subset of the target value of the state-of-motion received from the first controller 110. If the identifier sent by the first controller 110 is the identifier that the third controller 124 is currently using, as determined by looking up the original identifier in the table 164, then the third controller 124 derives a subset of an updated target value of the state-of-motion that is identical to the subset of the target value of the state-of-motion received from the first controller 110. If the original identifier sent by the first controller 110 has been replaced, as determined by looking up the original identifier in the table 164, then the third controller 124 derives the subset of the updated target value by using the offset values associated with all the intervening replacement identifiers, as read from the table 164.

Finally, in a block 325, the third controller 124 commands the subsystem 130 to approach the subset of the target value of the state-of-motion. If the subsystem 130 is the braking system and the subset of the target value of the state-of-motion includes, for example, a given longitudinal position and a longitudinal velocity of zero, then the third controller 124 commands the braking system 130 to apply brakes to slow the vehicle 90 to a stop at the given longitudinal position.

In order to carry out the processes described above, the first controller 110 may be programmed to do the following: receive from the second controller 120 the current value of the state-of-motion; store the replacement identifier and the offset value; store a table 160 of replacement identifiers and offset values associated with the replacement identifiers; determine the subset of the target value of the state-of-motion to be achieved by the subsystem 130; and transmit to the third controller 124 the replacement identifier and a command for the subsystem 130 to achieve the subset of the target value of the state-of-motion.

Likewise, in order to carry out the processes described above, the second controller 120 may be programmed to do the following: send a current value of the state-of-motion to the first controller 110; transmit the original identifier associated with the state-of-motion to the first controller 110; determine whether the current value of the state-of-motion has crossed a boundary condition; create a replacement identifier and an offset value associated with the replacement identifier; transmit the replacement identifier and the offset value associated with the replacement identifier to the first controller 110; and store a table 162 of replacement identifiers and offset values associated with the replacement identifiers.

Finally, in order to carry out the processes described above, the third controller 124 may be programmed to do the following: receive a command from the first controller 110 for the subsystem 130 to achieve the subset of the target value of the state-of-motion; command the subsystem 130 to approach the subset of the target value of the state-of-motion; derive a subset of an updated target value of the state-of-motion from the identifier and the subset of the target value of the state-of-motion received from the first controller 110; and store a table 164 of replacement identifiers and offset values associated with the replacement identifiers.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A method of controlling a vehicle comprising:
receiving, by a first controller, an identifier and a current value of a state-of-motion from a second controller, wherein the first controller and the second controller each have an update cycle;
determining a subset of a target value of the state-of-motion at a frequency dictated by the update cycle of the first controller; and
transmitting the identifier and a command for a subsystem to achieve the subset of the target value of the state-of-motion;
wherein the subsystem is one of a brake system and a steering system; and
the update cycle of the second controller is shorter than the update cycle of the first controller.

2. The method of claim 1, further comprising:
receiving an offset value associated with the identifier; and
storing the identifier and the offset value.

3. The method of claim 1, wherein the subsystem is the brake system.

4. The method of claim 1, wherein the subsystem is the steering system.

5. A method of controlling a vehicle, including a first controller, a second controller, and a third controller in communication with a subsystem, comprising:
receiving, by the first controller from the second controller, the current value of the state-of-motion and an identifier, wherein the first controller, the second controller, and the third controller each have an update cycle;

determining, by the first controller, a subset of a target value of the state-of-motion;

transmitting, by the first controller to the third controller, the identifier and a command for the subsystem to achieve the subset of the target value of the state-of-motion;

receiving, by the third controller from the first controller, the identifier and the command for the subsystem to achieve the subset of the target value of the state-of-motion; and commanding, by the third controller, the subsystem to approach the subset of the target value of the state-of-motion at a frequency dictated by the update cycle of the third controller;

wherein the subsystem is one of a brake system and a steering system;

the update cycle of the second controller is shorter than the update cycle of the first controller; and the update cycle of the third controller is shorter than the update cycle of the first controller.

6. The method of claim 5, further comprising:

determining, by the second controller, whether the current value of the state-of-motion has crossed a boundary condition; and creating, by the second controller, a replacement identifier and an offset value associated with the replacement identifier.

7. The method of claim 6, further comprising:

transmitting, by the second controller to the first controller, the replacement identifier and the offset value associated with the replacement identifier;

storing, by the first controller, the replacement identifier and the offset value; and transmitting, by the first controller to the third controller, the replacement identifier and a command for the subsystem to achieve the subset of the target value of the state-of-motion.

8. The method of claim 7, further comprising storing, by the first controller, replacement identifiers and offset values associated with the replacement identifiers.

9. The method of claim 6, further comprising storing, by the second controller, replacement identifiers and offset values associated with the replacement identifiers.

10. The method of claim 9, further comprising deriving, by the third controller, a subset of an updated target value of the state-of-motion from the original identifier and the subset of the target value of the state-of-motion received from the first controller.

11. The method of claim 5, wherein the subsystem is the brake system.

12. The method of claim 5, wherein the subsystem is the steering system.

13. A vehicle-control system comprising:

a first controller, comprising a processor and memory;

a second controller, comprising a processor and a memory, in communication with the first controller;

a third controller, comprising a processor and a memory, in communication with the first controller; and a subsystem in communication with the third controller; wherein the subsystem is one of a brake system and a steering system;

the first controller, the second controller, and the third controller each have an update cycle;

the update cycle of the second controller is shorter than the update cycle of the first controller;

the update cycle of the third controller is shorter than the update cycle of the first controller;

the first controller is programmed to receive from the second controller an identifier and a current value of the state-of-motion, determine a subset of the target value of the state-of-motion, and transmit the identifier and a command to the third controller for the subsystem to achieve the subset of the target value of the state-of-motion;

the second controller is programmed to send the identifier and the current value of the state-of-motion to the first controller; and the third controller is programmed to receive from the first controller the identifier and the command for the subsystem to achieve the subset of the target value of the state-of-motion, and command the subsystem to approach the subset of the target value of the state-of-motion at a frequency dictated by the update cycle of the third controller.

14. The vehicle-control system of claim 13, wherein the second controller is further programmed to transmit an original identifier associated with the state-of-motion to the first controller, determine whether the current value of the state-of-motion has crossed a boundary condition, and create a replacement identifier and an offset value associated with the replacement identifier.

15. The vehicle-control system of claim 14, wherein:

the second controller is further programmed to transmit the replacement identifier and the offset value associated with the replacement identifier to the first controller; and the first controller is further programmed to store the replacement identifier and the offset value and transmit to the third controller the replacement identifier and a command to achieve the subset of the target value of the state-of-motion.

16. The vehicle-control system of claim 15, wherein the first controller is further programmed to store replacement identifiers and offset values associated with the replacement identifiers.

17. The vehicle-control system of claim 14, wherein the second controller is further programmed to store replacement identifiers and offset values associated with the replacement identifiers.

18. The vehicle-control system of claim 17, wherein the third controller is further programmed to derive a subset of an updated target value of the state-of-motion from the original identifier and the subset of the target value of the state-of-motion received from the first controller.

19. The vehicle-control system of claim 13, wherein the subsystem is the brake system.

20. The vehicle-control system of claim 13, wherein the subsystem is the steering system.

* * * * *